US008845416B2

(12) United States Patent
Schwartz

(10) Patent No.: US 8,845,416 B2
(45) Date of Patent: Sep. 30, 2014

(54) SYSTEM AND METHOD FOR CASHLESS GAMING AND PROMOTIONS

(75) Inventor: Andrew J. Schwartz, Chester Springs, PA (US)

(73) Assignee: Automated Currency Instruments, Inc., West Chester, PA (US)

( * ) Notice: Subject to any disclaimer, the term of this patent is extended or adjusted under 35 U.S.C. 154(b) by 1897 days.

(21) Appl. No.: 11/849,747

(22) Filed: Sep. 4, 2007

(65) Prior Publication Data

US 2009/0061990 A1 Mar. 5, 2009

(51) Int. Cl.
*A63F 9/24* (2006.01)
*A63F 13/00* (2014.01)
*G06F 17/00* (2006.01)
*G06F 19/00* (2011.01)
*G07F 17/32* (2006.01)

(52) U.S. Cl.
CPC ........ *G07F 17/3248* (2013.01); *G07F 17/3255* (2013.01); *G07F 17/32* (2013.01)
USPC .................... 463/25; 463/16; 463/20; 463/42

(58) Field of Classification Search
USPC .......................................... 463/16, 20, 25, 42
See application file for complete search history.

(56) References Cited

U.S. PATENT DOCUMENTS 5,816,918 A * 10/1998 Kelly et al. .................... 463/16
6,939,234 B2 * 9/2005 Beatty ............................ 463/42
7,028,907 B2 * 4/2006 Collins et al. ................ 235/470
7,341,518 B2 * 3/2008 Muskin ........................... 463/25
2004/0204233 A1 * 10/2004 Saffari et al. .................. 463/25
2005/0215316 A1 * 9/2005 Rowe et al. .................... 463/29

* cited by examiner

*Primary Examiner* — Sunit Pandya
*Assistant Examiner* — Wei Lee
(74) *Attorney, Agent, or Firm* — Mendelsohn, Drucker & Dunleavy, P.C.; Steve Mendelsohn

(57) ABSTRACT

A method and system for administering and managing promotional gaming vouchers and segregating promotional credits from normal play credit includes a plurality of gaming machines coupled to a back-end controller for monitoring play on the gaming machines and segregating cash and promotional credits of a plurality of promotional gaming vouchers. The vouchers may have only one embedded value (total value) and may be treated as any other cashless gaming voucher, thereby allowing use in older gaming machines that may be unable to read vouchers having more than one embedded value (i.e., cash and promotional values). Accordingly, the back-end controller may keep track of promotional plays and update a voucher database that logs total values and promotional values of the vouchers. Upon cashing out, the database may be interrogated and only a cash value of the voucher disbursed, where any remaining promotional value may be printed on a new voucher.

34 Claims, 5 Drawing Sheets

200

| Voucher ID (201) | Player ID (202) | Status (203) | Date (204) | Time (205) | Total Value (206) | Bonus Value (BV) (207) | BV Used (208) | BV Exp. Date (209) | BV Exp. Time (210) | BV Min. Plays (211) | Asset # (212) | Handle Value (213) |
|---|---|---|---|---|---|---|---|---|---|---|---|---|
| 10245 | 20549 | Active | 1/1/2006 | 3:00 | 1000 | 50 | 0 | 1/1/2008 | 0:00 | 1 | 00555 | 155 |
| | | | | | | ⋮ | | | | | | |
| 10455 | 43343 | Inactive | 5/3/2005 | 22:00 | 475 | 0 | 50 | 5/30/2006 | 0:00:00 | 0 | 04044 | 259 |

200

201 202 203 204 205 206 207 208 209 210 211 212 213

| Voucher ID | Player ID | Status | Date | Time | Total Value | Bonus Value (BV) | BV Used | BV Exp. Date | BV Exp. Time | BV Min. Plays | Asset # | Handle Value |
|---|---|---|---|---|---|---|---|---|---|---|---|---|
| 10245 | 20549 | Active | 1/1/2006 | 3:00 | 1000 | 50 | 0 | 1/1/2008 | 0:00 | 1 | 00555 | 155 |
| | | | | | | ⋮ | | | | | | |
| 10455 | 43343 | Inactive | 5/3/2005 | 22:00 | 475 | 0 | 50 | 5/30/2006 | 0:00:00 | 0 | 04044 | 259 |

Fig. 2

SYSTEM AND METHOD FOR CASHLESS GAMING AND PROMOTIONS

FIELD OF INVENTION

The present invention relates generally to cashless casino gambling and, more particularly, to a system and method for tracking promotional play in casino cashless gambling.

BACKGROUND

In modern casinos, a network of controllers and monitors may be configured to track gambling activity on a casino's various gaming machines (e.g., slot machine, video poker, video blackjack, etc.). Some of the gaming machines may be configured according to the Slot Accounting System (SAS) 6.0 standard to implement cashless gaming, otherwise known as "ticket in ticket out" (TITO) gaming. Prior to the implementation of such systems, casinos were forced to implement gambling promotions by giving bills and coins to gamblers for use in the casino. Since tracking of bills and coins is undesirably difficult and unreliable, gambling promotion funds may have been used for non-gambling activities. Gamblers may have even pocketed the promotional funds that were meant to be gambled in the casino running the promotion.

This problem has been addressed, to some extent, by current cashless gaming systems, which allow casinos to control the use of promotional funds by disbursing promotional gaming vouchers that may only be redeemed at gaming machines in participating casinos. Accordingly, gamblers may only use their promotional gaming vouchers at gaming machines in the participating casinos, whereby any money that they win from playing the promotional gaming vouchers are credited back to the gaming voucher. Some gaming machines are able to segregate, on the gaming voucher itself, the promotional value of the gaming voucher from any cash value accrued through deposits on the gaming voucher or jackpots credited to the gaming voucher. However, these gaming machines are undesirably expensive and have not yet replaced older cashless gaming machines, which are unable to segregate promotional gaming values from cash values on the gaming vouchers.

Accordingly, gamblers using the older cashless gaming machines are able to cash out their promotional gaming vouchers and thereby pocket any remaining promotional value on the gaming voucher in addition to any accrued cash value. Indeed, gamblers may even choose to cash out their vouchers for the promotional funds without ever gambling at any of the gaming machines. This, again, leads to the undesirable pocketing and/or unrestricted use of the casino's promotional funds. Furthermore, casinos are unable to definitively track the usage of promotional funds and are, therefore, unable to claim promotional expenses associated with the disbursement of such funds as marketing expenses on their taxes. This creates undesirable losses and inefficiency associated with casino gambling promotions.

SUMMARY

The present invention is embodied in a method of administering a gaming promotion by generating one or more gaming vouchers having a unique identifier and a total value, creating entries in a gaming voucher database corresponding to the gaming vouchers and including the unique identifiers, the total values, and one or more promotional values of the gaming vouchers. The method may also communicate with one or more gaming machines to obtain a credit meter value and a handle meter value corresponding to one or more plays of the gaming vouchers, whereby the total value and the promotional value of the entry in the gaming voucher database may be updated based on the credit meter value and the handle meter value. In a further embodiment, the method may receive, from a cashier or a kiosk, a request for payment on a gaming voucher, the request including the unique identifier of the gaming voucher. The entry corresponding to the gaming voucher having the unique identifier may then be obtained from the gaming voucher database, and a cash value of the gaming voucher may be determined based on the promotional value and the total value of the gaming voucher. In one embodiment, for example, the cash value may be determined by subtracting the total value by the promotional value of the gaming voucher. The cash value may then be authorized for payment by the cashier or kiosk.

In a further embodiment, the invention may be a system for cashless gaming that includes a plurality of gaming vouchers distributed to a plurality of players, one or more gaming machines configured to receive the gaming vouchers, a gaming voucher database having information on the plurality of gaming vouchers, the information including a unique identifier, a total value, and a promotional value for each one of the plurality of gaming vouchers, and a system controller configured to monitor one or more plays of the plurality of gaming vouchers on the one or more gaming machines, and to update the gaming voucher database based on the one or more plays.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures:

FIG. 2 is an exemplary promotional gaming voucher database table, according to the present invention;

DETAILED DESCRIPTION OF THE PREFERRED EMBODIMENTS

The present invention may be embodied in a system and method for implementing a cashless gaming promotion, whereby promotional and cash values of a gaming vouchers are segregated via a gaming voucher database, which also may be used to track gaming activity with the gaming vouchers. Accordingly, such a system may be implemented with existing gaming machines, which may be able to read only a single total value of a gaming voucher, and existing gaming vouchers, which may be able to store only a single value for reception by the existing gaming machines. The gaming voucher database may also be used to determine the aggregate amount of promotional funds that were played in the casino within a given time period, such as one day, for example. This may allow casinos to provide verifiable proof that such promotional funds were played in their gaming machines within the given time period, thereby allowing the casino to reclaim the promotional funds on their taxes as a marketing expense. It may also be desirable to interrogate the gaming voucher database whenever a gambler attempts to cash out a gaming voucher for payment at a cashier or kiosk, thereby preventing the payment of promotional gaming funds as cash but allowing the payment of any accrued cash values on the gaming vouchers.

Figure 1A:
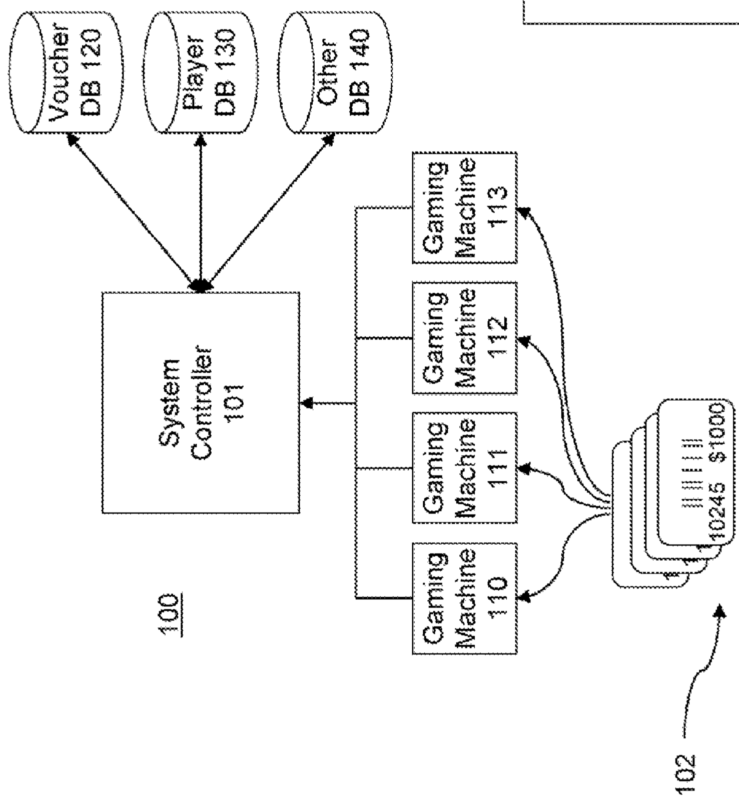
FIG. 1*a* is a block diagram of a system for casino gaming and promotional gaming voucher management, according to the present invention.

Referring now to the drawings, in which like reference numbers refer to like elements throughout the various figures that comprise the drawings, FIG. 1*a* is a block diagram of an exemplary system 100 for cashless gaming. Gaming vouchers 102 are distributed to players/gamblers as part of a casino gambling promotion. In this embodiment, each of the gaming vouchers 102 comprise a paper ticket having a two-dimensional bar code 103 printed thereon which contains a unique identifier for the gaming voucher 102 and may optionally include other data relating to the voucher 102. Each gaming voucher 102 may optionally include an inscription 104 indicating the unique identifier and/or a total value of the gaming voucher 102.

In alternate embodiments of the invention, other types of gaming vouchers, such as, but not limited to, chips, tokens, cards and other types of cashless gaming media, could be used instead of the printed paper gaming vouchers 102. As used in the claims, the term "gaming voucher" is intended to mean any type of cashless gaming media. Similarly, other machine-readable elements, such as, but not limited to, three-dimensional bar codes, radio frequency identification (RFID) tags, or magnetic data strips, could be used as part of the gaming vouchers 102 instead of a two-dimensional bar code 103.

System 100 may also include gaming machines 110-113, which are configured to receive gaming vouchers 102 for play on the gaming machines 110-113. Each of gaming machines 110-113 may be any gambling device known to those of skill in the art, such as, a slot machine, a video slot machine, a video poker machine, a video blackjack machine, a roulette machine, and a keno machine, for example. Gaming machines 110-113 may also be coupled to system controller 101, which may be configured to monitor plays on gaming machines 110-113. More specifically, system controller 101 may monitor plays on gaming machines 110-113 with any one of the gaming vouchers 102.

System controller 101 is also configured to generate and maintain a gaming voucher database 120, which stores information on gaming vouchers 102, such as the unique identifier, the total value, and a promotional value for each one of gaming vouchers 102. The promotional value is a value that has been set aside by the casino for promotional gaming on gaming machines 110-113. Accordingly, gaming voucher database 120 may keep this promotional value segregated from the total value of any given gaming voucher, which may be a sum of the promotional value and a cash value. The cash value may be accrued, for example, by depositing money, which is added onto the gaming voucher, or by winning at any of gaming machines 110-113.

In a further embodiment, system controller 101 may also be configured to maintain player account database 130, which may be used to store information about gamblers based on their casino loyalty card/account. More specifically, information stored on player account database 130 may include a unique player identifier corresponding to each gambler being monitored, as well as gaming voucher identifiers corresponding to any gaming vouchers 102 distributed to each player. Accordingly, system controller 101 may monitor promotional plays by each player with each gaming voucher 102 distributed to said player. In yet a further embodiment, system controller 101 may be configured to maintain any other database 140 such as a gaming machine database for logging plays on gaming machines 110-113 for statistical tracking purposes, for example.

Referring now to FIG. 2, an exemplary voucher database 200 is shown as having voucher ID column 201, date column 202, time column 203, value column 204, asset number column 205, status column 206, and bonus value column 207. Voucher ID column 201 may store the unique identifier for each gaming voucher 102, such as gaming vouchers "10245" and "10455" shown in FIG. 2. Date column 202 may store a date corresponding to the last play on the gaming voucher. Alternately, date column 202 may store a date corresponding to the date the gaming voucher was issued. Time column 203 may store a time corresponding to the last play on the gaming voucher. Alternately, time column 203 may store a time corresponding to the time the gaming voucher was issued. Date and time columns 202 and 203, respectively, may be used to monitor cheating such as, for example, if the same gaming voucher is used simultaneously, thereby indicating an unauthorized replication of the gaming voucher. Value column 204 may store the total value of the gaming voucher, which includes the promotional value, as well as any accrued cash values. Asset number column 205 may store identifying information on the gaming machine that the gaming voucher was last played on. Asset number "00555" may correspond, for example, to a particular video slot machine in the casino. Status column 206 may store an indication of the last known status of a gaming voucher. For example, the status of gaming voucher "10245" may be "Active," thereby indicating that the voucher is currently being played on gaming machine "00555." Bonus value column 207 may store the promotional value stored on each gaming voucher. For example, gaming voucher "10245" may have a promotional value of "50," thereby indicating that gaming voucher "10245" has $50 worth of promotional plays left and has accrued a cash value of $950 (i.e., total value subtracted by the promotional value).

In a further embodiment of the invention, voucher database 200 may also include a minimum plays requirement column 208, a voucher expiration date column 209, and a player account identifier column 210. Minimum plays requirement column 208 may store a number of plays remaining on the voucher before a gambler is allowed to cash out the gaming voucher for the cash value accrued thereon. For example, gaming voucher "10245" may have a minimum plays value of "1," thereby indicating that one more play(s) must be made with the voucher before a gambler is allowed to cash it out. The minimum plays column may be updated by the system controller each time a play is detected on a gaming machine in the casino, such as be decrementing the stored number of plays by one, for example. Voucher expiration date column 209 may store an expiration date of the gaming voucher, thereby preventing play on the gaming machine with the promotional value if the expiration date of the gaming voucher has passed. For example, gaming voucher "10245" may have an expiration date of Sep. 9, 2007. In such an implementation, the system controller may allow a gaming machine to credit only the cash value of a gaming voucher and not the expired promotional value. Player account identifier column 210 may store a player ID that identifies a particular gambler according to their loyalty card/account. For example, gaming voucher "10245" may have been assigned to a gambler identified by player account number "20549." Accordingly, the player may be credited, per their loyalty card/account, for promotional or cash plays on the gaming machines, for example.

Figure 1B:
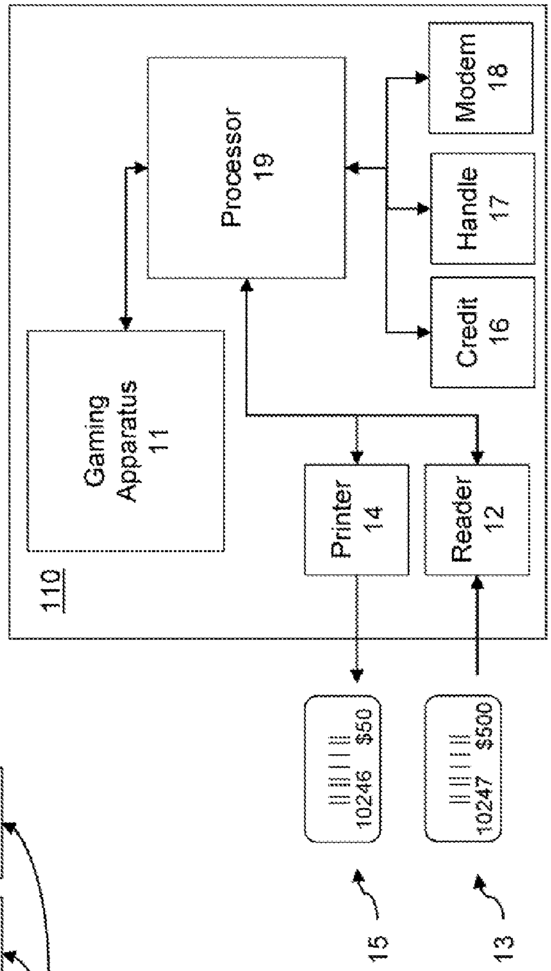
FIG. 1*b* is a block diagram of an exemplary gaming machine, according to the present invention.

In a further embodiment of the invention illustrated by FIG. 1*b*, an exemplary gaming machine 10 of gaming machines 110-113 may include a gaming apparatus 11 for facilitating play, a reader for receiving a gaming voucher 13, printer 14 for printing a new gaming voucher 15 based on play on gaming apparatus 11, credit meter 16 for crediting the total value of gaming voucher 13 for play on gaming apparatus 11, handle meter 17 for deducting a handle amount from the total value for each play on gaming apparatus 11, and modem 18 configured to communicate with system controller 101. Gaming machine processor 19 may be configured to operate the components, above, of gaming machine 10. Gaming apparatus 11 may be any casino game, such as a video poker game, a slot game, a video slot game, a video blackjack game, a keno game, or a roulette game, for example.

Reader 12 receives a gaming voucher 13, reads the bar code 103, and determines the total value to be credited for play using the credit meter 16. Reader 12 may also determine the unique identifier of the gaming voucher for communication to system controller 101 via modem 18. Modem 18 may be an RS-232 modem, an Ethernet modem, a Wi-Fi modem, or any other means for communicating with system controller 101 known to those of ordinary skill in the art. Handle meter 17 records the number of times a gambler plays on gaming machine 10. Each time that the gaming apparatus 11 is played, a handle amount (i.e., the number of credits bet on that play) is deducted from the credit meter 16. If the play results in a credits being awarded, a corresponding amount is added to the credit meter 16.

As described above, gaming machine 10 may be interrogated by system controller 101 via modem 18 in order to obtain data from the handle meter 17 and credit meter 16 so that the system controller 101 may determine an updated promotional and total value of the gaming voucher 13 being played.

Figure 3:
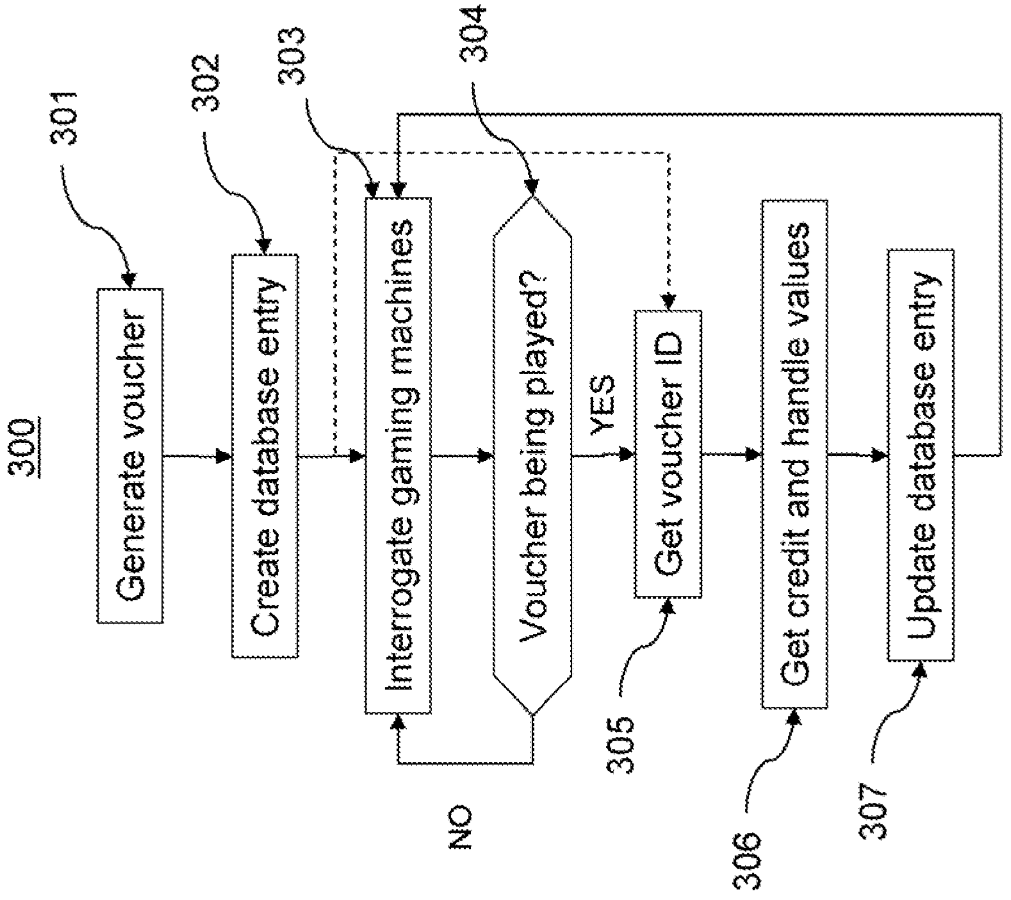
FIG. 3 is a flowchart illustrating an exemplary method of generating and managing a promotional gaming voucher database, according to the present invention.

Referring now to FIG. 3, a flow chart is shown illustrating an exemplary method 300 of administering a gaming promotion according to the present invention. Method 300 may begin with step 301 by generating a gaming voucher having a unique identifier and a total value. A promotional value of the gaming voucher may be generated and implemented by a system controller implementing the method (such as system controller 100). In a further embodiment, step 301 may also print the unique identifier and the total value on the gaming voucher. In yet a further embodiment, step 301 may also print a facility brand, a voucher type, a date of issuance, and/or a time of issuance on the voucher. The facility brand may be a logo or name of a casino or other entity administering the gaming promotion. The voucher type may include text identifying the gaming voucher as a promotional gaming voucher. In a further step (not shown in FIG. 3), the gaming voucher may be distributed, such as to a casino patron, for example.

Step 302 may then create an entry in a gaming voucher database corresponding to the gaming voucher and including the unique identifier, the total value, and a promotional value of the voucher. This may include creating a row in the gaming voucher database having at least a unique identifier column, a total value column, and a promotional value column. If desired, the database may also include a date column, a time column, an asset number column, and/or a current status column.

Step 303 may then interrogate (i.e., communicate with) one or more gaming machines participating in the gaming promotion. Step 303 could consist of polling each of the gaming machines at a predetermined frequency. For example, the predetermined frequency could be equal to or less than the amount of time required to execute one play on one of the gaming machines, in which case, the polling could be considered as being performed in real-time. Step 304 may then determine whether a gaming voucher is being played in the interrogated gaming machine. If a gaming voucher is not being played, the process moves back to step 303 to interrogate another gaming machine. If a gaming voucher is being played, however, step 305 then obtains the unique identifier of the gaming voucher being played. Step 306 may then obtain a credit meter value and a handle meter value of the gaming machine, where the credit meter value corresponds to the total value left remaining on the gaming voucher and the handle meter value corresponds to the number of times the gaming machine has been played and the total cost thereof.

In an alternate embodiment, step 303 could be triggered by a notification from a gaming machine when the gaming machine receives a gaming voucher for play and/or when the gaming machine received a request for withdrawal of credits from that gaming machine. In such an embodiment, step 304 would be unnecessary, and therefore, the process would skip step 305 (as indicated by the dashed line in FIG. 3).

Step 307 may then update the total value and the promotional value of an entry in the gaming voucher database that corresponds to the gaming voucher being played. The updated total and promotional values are based on the credit meter value and the handle meter value obtained in step 306. This updating step may include, for example, setting the total value of the gaming voucher equal to the credit meter value. If the promotional value is greater than the handle meter value, the updated promotional value may be set equal to the old promotional value subtracted by the handle meter value, indicating that not all of the promotional funds were spent playing the machine. If the promotional value is less than or equal to the handle meter value, however, the updated promotional value may be set equal to zero, indicating that all of the promotional funds were spent playing the machine. The voucher database maintenance process described above may then repeat with step 303. Additionally, steps 301-307 may be repeated for additional gaming vouchers, each additional voucher having its own unique identifier, total value, and entry in the gaming voucher database.

In a further embodiment, an entity administering the gaming promotion may opt to keep track of promotional gaming funds spent by casino patrons within a predetermined amount of time, such as a 24-hour period, for example. This may be done by determining a promotional played value for each gaming voucher and aggregating the promotional played value for all gaming vouchers. The promotional played value for each voucher may be calculated by subtracting the promotional value of a gaming voucher at the end of the predetermined time period from the promotional value of the voucher at the beginning of the predetermined time period, thereby indicating the total amount of promotional funds that were played on a gaming machines with the gaming voucher. By accurately tracking use of promotional funds in Accordingly, the entity administering the promotion may be able to discount their total revenue value for the predetermined time period by subtracting the promotional played value from the total revenue during the predetermined period of time. This may allow the entity to accurately calculate marketing expenses associated with the promotional funds by reclaiming portions of the funds that were played in the predetermined amount of time in their total revenues for that amount of time, thereby allowing the entity to capitalize on desirable tax savings.

Figure 4:
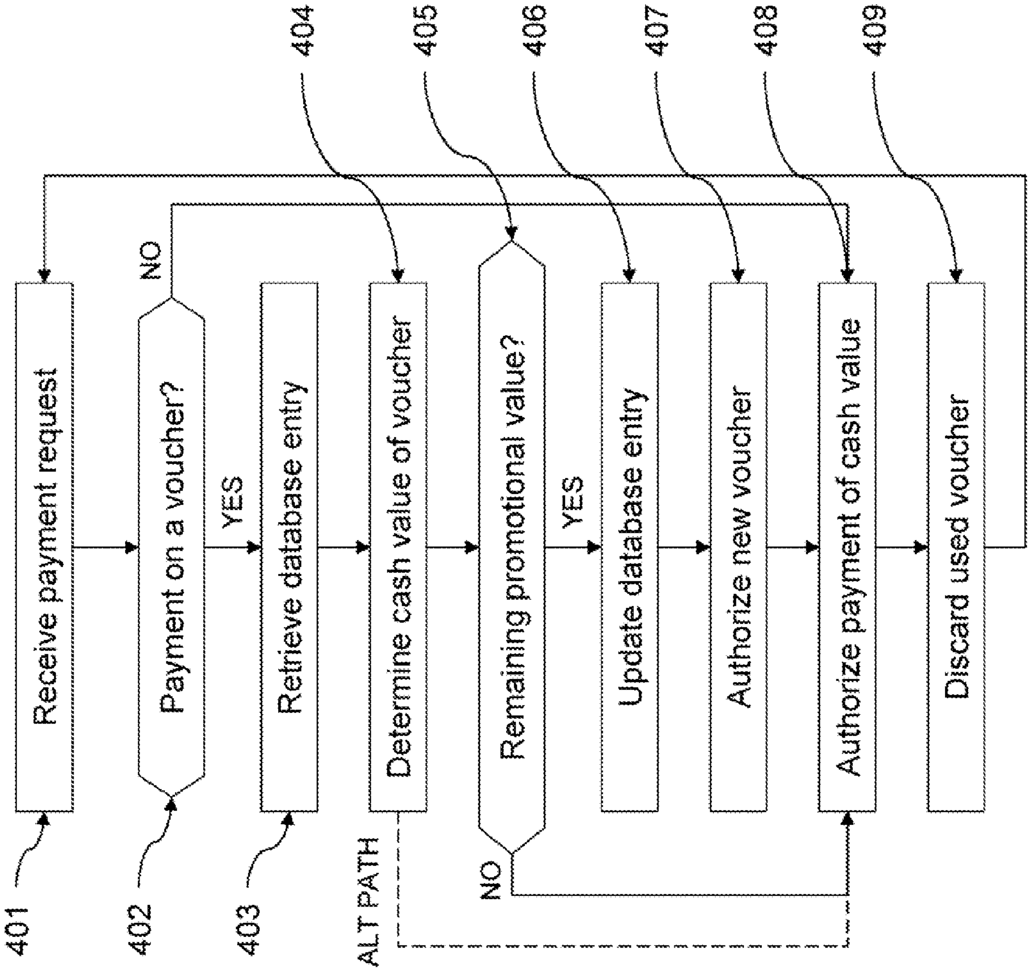
FIG. 4 is a flowchart illustrating an exemplary method of authorizing payment on a promotional gaming voucher, according to the present invention.

Once a casino patron is ready to cash out his/her gaming voucher for payment, he/she may submit the gaming voucher to a kiosk or cashier for payment. Accordingly, the kiosk or cashier may communicate with the system controller 101 to determine the cash value and promotional value of the gaming voucher, thereby ensuring that only the cash value is disbursed as cash and that the promotional value is either discarded or reissued on a new gaming voucher. FIG. 4 illustrates such an exemplary method 400 of cashing out the gaming voucher.

Method 400 may begin with step 401, which receives a request for payment on a gaming voucher from a cashier or a kiosk. If in step 402 it is determined that the request for payment is for a promotional gaming voucher, the method proceeds to step 403. The request for payment may include the unique identifier of the gaming voucher. Step 403 may then obtain, from the gaming voucher database, the entry corresponding to the gaming voucher having the unique identifier. Next, step 404 may determine a cash value of the gaming voucher based on the promotional value and the total value of the gaming voucher obtained from the gaming voucher database entry. The cash value may be determined by subtracting the total value by the promotional value, for example. In one embodiment of the invention, the method may then proceed along "ALT PATH" to step 408, which authorizes the cash value for payment by the cashier or kiosk. Step 409 may then discard the used promotional voucher.

In an alternate embodiment, the method may proceed from step 404 to step 405, which determines whether there is any remaining promotional value on the gaming voucher. If there is, step 406 may then update the total value and the promotional value of the gaming voucher's entry in the gaming voucher database. If the entire cash value is to be paid out, the updated total value may be equal to any remaining promotional value. If the entire cash value is not to be paid out, then the updated total value may be equal to the sum of the remaining cash value and any remaining promotional value. If there is no remaining cash or promotional value, the gaming voucher's entry may be removed from the database or, alternately, tagged as "inactive" and step 407 may be omitted. Alternately, the promotional value may be reset to a predetermined value and step 407 may be performed. Step 407 authorizes a new voucher having the updated total and promotional values for distribution to a casino patron. Step 408 may authorize the cash value for payment by the cashier or kiosk, and step 409 may discard the used gaming voucher. In one embodiment, a second gaming voucher may be printed having a second unique identifier and the updated total and promotional values. The second unique identifier may be the same as the old identifier or, alternately, it may be a random new identifier.

Figure 5:
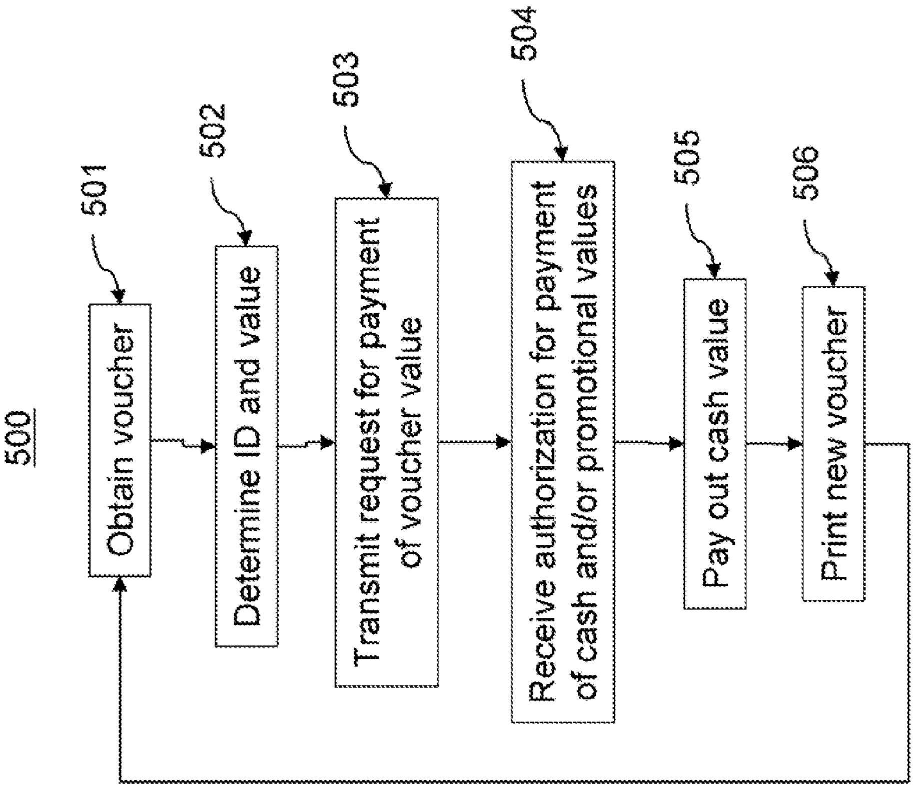
FIG. 5 is a flowchart illustrating an exemplary method of requesting payment on a promotional gaming voucher, according to the present invention.

FIG. 5 illustrates a further embodiment of the invention, which may be method 500 of cashing out a gaming voucher having a total value and a unique identifier. Method 500 may begin with step 501, which obtains the gaming voucher from a casino patron seeking payment on a total value of the gaming voucher. Step 502 may then determine the unique identifier and the total value the gaming voucher by reading an inscription or barcode on the gaming voucher, for example. Step 503 may transmit a request for payment of the total value to a system controller. The system controller may then determine the cash value that may be paid out, as described above, and transmit an authorization for payment of the cash value, where payment is in the form of bills and/or coins. Step 504 then receives the authorization for payment of the cash value. Alternately, the system controller may also determine a promotional value that may be printed on a new voucher, as described above, and transmit an authorization for payment of the promotional value, where payment is in the form of a new gaming voucher having the promotional value. Accordingly, in some situations, the cash value may be equal to the total value (i.e., where all of the promotional value has been played) and in other situations, the cash value may be less than the total value (i.e., where there is some promotional value remaining on the gaming voucher). Step 505 may then pay out the cash value of the gaming voucher. In a further step (not shown in FIG. 5) the method may transmit a payment confirmation to the system controller, thereby indicating that the cash was paid out. If, in step 504 an authorization for payment of the promotional value is also received, then step 506 may print a new gaming voucher having a new unique identifier and a new total value. The new unique identifier may be the same as the old unique identifier or an entirely new, random unique identifier. Further, the new total value may be equal to the promotional value authorized for payment.

Those skilled in the art may recognize that other gambling promotions may be implemented by the present system, such as jackpots, instant bonuses, matched play, etc. These additional promotions may be implemented, for example, at the time of payment on the gaming voucher, where the system controller may authorize payment of a cash value greater than the total value of the gaming voucher.

Although illustrated and described above with reference to certain specific embodiments, the present invention is nevertheless not to be limited to the details shown. Rather, various modifications may be made in the details within the scope and range of equivalents of the claims and without departing from the invention.

What is claimed is:

1. A method comprising:

creating an entry in a gaming voucher database, the entry corresponding to a gaming voucher having a unique identifier and a total value, the entry including the unique identifier, the total value, and a promotional value associated with the gaming voucher;

communicating with one or more gaming machines to obtain a credit meter value and a handle meter value corresponding to one or more plays of the gaming voucher, wherein, upon receipt of the gaming voucher, a gaming machine is aware of the total value associated with the gaming voucher, but the gaming machine is unable to segregate the promotional value associated with the gaming voucher from the total value associated with the gaming voucher; and updating the total value and the promotional value of the entry in the gaming voucher database based on the credit meter value and the handle meter value.

2. The method of claim 1, further comprising the steps of:

receiving a request for payment on the gaming voucher, the request for payment including the unique identifier;

obtaining, from the gaming voucher database, the entry corresponding to the gaming voucher having the unique identifier;

determining, based on the promotional value and the total value of the gaming voucher, a cash value of the gaming voucher; and authorizing the cash value for payment.

3. The method of claim 2, wherein the receiving step receives the request from a cashier or a kiosk and the authorizing step authorizes the cash value for payment by the cashier or the kiosk.

4. The method of claim 2, wherein the determining step determines the cash value by subtracting the promotional value from the total value.

5. The method of claim 2, further comprising the steps of:

updating the total value and the promotional value of the entry in the gaming voucher database based on the cash value authorized for payment; and authorizing generation of a second gaming voucher having a second unique identifier and a second total value.

6. The method of claim 1, wherein the unique identifier and the total value are printed on the gaming voucher.

7. The method of claim 6, wherein one or more of a facility brand, a voucher type, a date of issuance, and a time of issuance are printed on the gaming voucher.

8. The method of claim 1, wherein the creating step includes creating a row in the gaming voucher database having one or more of a unique identifier column, a date column, a time column, a total value column, an asset number column, a status column, and a promotional value column.

9. The method of claim 1, wherein the communicating step includes polling the one or more gaming machines with a predetermined frequency to obtain the credit meter value and the handle meter value.

10. The method of claim 1, wherein the communicating step includes receiving, from the one or more gaming machines, a request to withdraw credits from a respective one of the gaming machines, the request including the credit meter value and the handle meter value.

11. The method of claim 1, wherein the updating step includes:

setting the total value equal to the credit meter value;

setting the promotional value equal to the promotional value subtracted by the handle meter value, if the promotional value is greater than the handle meter value; and setting the promotional value equal to zero, if the promotional value is less than or equal to the handle meter value.

12. The method of claim 1, further including the steps of:

determining, based on the promotional value and the updated promotional value, a promotional played value; and discounting, by the promotional played value, a total revenue value for a predetermined time period; wherein the one or more plays occurred within the predetermined time period.

13. The method of claim 12, wherein the determining step determines the promotional played value by subtracting the updated promotional value from the promotional value.

14. The method of claim 1, further comprising the steps of:

repeating the creating step to create one or more additional entries in the gaming voucher database, the entries corresponding to one or more additional gaming vouchers and each additional entry including respective ones of additional unique identifiers, additional total values, and one or more additional promotional values associated with the one or more additional gaming vouchers;

repeating the communicating step to obtain one or more additional credit meter values and one or more additional handle meter values corresponding to one or more additional plays of the one or more additional gaming vouchers; and updating the one or more additional total values and the one or more additional promotional values of the additional entries in the gaming voucher database based on the additional credit meter values and additional handle meter values.

15. The method of claim 14, further comprising the steps of:

receiving, from a cashier or kiosk, a request for payment on one of the one or more gaming vouchers, the request for payment including a respective unique identifier;

obtaining, from the gaming voucher database, a respective entry corresponding to the one gaming voucher having the respective unique identifier;

determining, based on a respective promotional value and a respective total value of the one gaming voucher, a cash value of the one gaming voucher; and authorizing the cash value for payment by the cashier or the kiosk.

16. The method of claim 14, further comprising the steps of:

determining, based on the one or more additional promotional values and the updated one or more additional promotional values, a promotional played value; and discounting, by the promotional played value, a total revenue value for a predetermined time period; wherein the one or more additional plays occurred within the predetermined time period.

17. The method of claim 16, wherein the determining step determines the promotional played value by subtracting a sum of the updated one or more additional promotional values from a sum of the one or more promotional values.

18. A method of cashing out a gaming voucher having a total value and a unique identifier at a non-gaming kiosk of a gaming system, the method comprising the steps of:

the non-gaming kiosk obtaining the gaming voucher;

the non-gaming kiosk determining the unique identifier and the total value for the gaming voucher;

the non-gaming kiosk transmitting, to a system controller of the gaming system, a request for payment of the total value;

the non-gaming kiosk receiving, from the system controller, (i) authorization for payment of a cash value that is different from the total value and (ii) identification of a promotional value associated with the gaming voucher;

the non-gaming kiosk paying out the cash value; and the non-gaming kiosk generating a new gaming voucher having a new unique identifier and a new total value, wherein:

the new total value is equal to the promotional value associated with the gaming voucher; and upon receipt of the new gaming voucher, a gaming machine of the gaming system is aware of the total value associated with the gaming voucher, but the gaming machine is unable to segregate a promotional value associated with the new gaming voucher from the total value associated with the new gaming voucher, while the system controller is able to segregate the promotional value associated with the new gaming voucher from the total value associated with the new gaming voucher.

19. The method of claim 18, further including the step of transmitting a payment confirmation indicating that the cash value was paid out.

20. A system for cashless gaming, the system comprising:

one or more gaming machines configured to receive a plurality of gaming vouchers, wherein:

a gaming voucher has a unique identifier and a total value; and upon receipt of a gaming voucher, a gaming machine is aware of the total value associated with the gaming voucher, but the gaming machine is unable to segregate a promotional value associated with the gaming voucher from the total value associated with the gaming voucher;

a gaming voucher database having information on the plurality of gaming vouchers, the information including a unique identifier, a total value, and a promotional value for each one of the plurality of gaming vouchers; and a system controller configured to monitor one or more plays of the plurality of gaming vouchers on the one or more gaming machines, and to update the gaming voucher database based on the one or more plays.

21. The system of claim 20, further comprising a player account database having information on one or more of the plurality of players, the information including at least a unique player identifier and one or more of the unique identifiers corresponding to gaming vouchers distributed to respective players.

22. The system of claim 20, wherein each one of the plurality of gaming vouchers includes an inscription indicating the unique identifier and the total value of the gaming voucher.

23. The system of claim 20, wherein each one of the one or more gaming machines is one of a slot machine, a video poker machine, a video blackjack machine, a roulette machine, and a keno machine.

24. The system of claim 20, wherein the gaming voucher database includes a plurality of rows corresponding to respective ones of the plurality of gaming vouchers, and one or more of a unique identifier column, a date column, a time column, a total value column, an asset number column, a status column, and a promotional value column.

25. The system of claim 24, wherein the gaming voucher database further includes one or more of a minimum plays requirement column, a voucher expiration date column, and a player account identifier column.

26. The system of claim 20, wherein each one of the one or more gaming machines includes:

a gaming apparatus for facilitating the one or more plays;

a card reader for receiving one of the plurality of gaming vouchers;

a card printer for printing a new gaming voucher based on the one or more plays;

a credit meter for crediting the total value for play on the gaming apparatus and for crediting wins to the total value;

a handle meter for deducting a handle amount from the total value for each one of the one or more plays; and a modem for communicating with the system controller.

27. The system of claim 20, further comprising a device, such that, upon receipt by the device of (i) a first gaming voucher having a first unique identifier and a first total value and (ii) a request for cashing out the first gaming voucher:

the device transmits the request for cashing out the first gaming voucher to the system controller;

the system controller accesses the gaming voucher database to determine a cash value for the first gaming voucher and a new total value for a new gaming voucher, wherein:

the cash value is the first total value minus a first promotional value associated with the first gaming voucher; and the new total value is the first promotional value;

the system controller transmits the cash value and the new total value to the device; and the device generates the new gaming voucher having the new total value.

28. The method of claim 27, wherein the device is a kiosk that pays out the cash value.

29. A method for modifying an existing gaming system having a system controller in communication with one or more gaming machines designed to receive gaming vouchers, each gaming voucher having a unique identifier and a single value, wherein, upon receipt of a gaming voucher, a gaming machine recognizes the single value as a total value associated with the gaming voucher, the method comprising:

(a) modifying or adding a gaming voucher database in the gaming system, wherein an entry in the gaming voucher database has the unique identifier, the total value, and a promotional value associated with a gaming voucher; and (b) modifying the system controller to support the gaming voucher database, such that, upon receipt by a gaming machine of the gaming voucher having the unique identifier and the total value:

the gaming machine is aware of the total value of the gaming voucher, but unable to segregate the promotional value associated with the gaming voucher from the total value associated with the gaming voucher;

the gaming machine allows a player to play the gaming machine based on the total value of the gaming voucher;

the gaming machine transmits, to the modified system controller, a credit meter value and a handle meter value based on one or more plays by the player; and the modified system controller updates the total value and the promotional value associated with the gaming voucher in the gaming voucher database based on the credit meter value and the handle meter value.

30. The method of claim 29, such that, upon receipt of a request from the player to terminate play of the gaming machine:

the gaming machine transmits the request to terminate play to the modified system controller;

the modified system controller accesses the gaming voucher database, authorizes the gaming machine to generate a new gaming voucher for the player, and transmits the updated total value to the gaming machine; and the gaming machine generates the new gaming voucher for the player based on the updated total value without knowledge of any promotional value associated with the new gaming voucher.

31. The method of claim 29, further comprising:

(c) modifying or adding a device in the gaming system, such that, upon receipt by the device of (i) a first gaming voucher having a first unique identifier, a first total value, and a first promotional value and (ii) a request for cashing out the first gaming voucher:

the device transmits the request for cashing out the first gaming voucher to the modified system controller;

the modified system controller accesses the gaming voucher database to determine a cash value for the first gaming voucher and a new total value for a new gaming voucher, wherein:

the cash value is the first total value minus the first promotional value; and the new total value is the first promotional value;

the modified system controller transmits the cash value and the new total value to the device; and the device generates the new gaming voucher having a total value equal to the new total value.

32. The method of claim 31, wherein the device is a kiosk that pays out the cash value.

33. A non-gaming kiosk for cashing out a gaming voucher having a total value and a unique identifier in a gaming system, the non-gaming kiosk adapted to:

obtain the gaming voucher;

determine the unique identifier and the total value for the gaming voucher;

transmit, to a system controller of the gaming system, a request for payment of the total value;

receive, from the system controller, (i) authorization for payment of a cash value that is different from the total value and (ii) identification of a promotional value associated with the gaming voucher;

pay out the cash value; and generate a new gaming voucher having a new unique identifier and a new total value, wherein:

the new total value is equal to the promotional value associated with the gaming voucher; and upon receipt of the new gaming voucher, a gaming machine of the gaming system is aware of the total value associated with the gaming voucher, but the gaming machine is unable to segregate a promotional value associated with the new gaming voucher from the total value associated with the new gaming voucher, while the system controller is able to segregate the promotional value associated with the new gaming voucher from the total value associated with the new gaming voucher.

34. A user-operated, non-gaming machine terminal for cashing out a gaming voucher having a total value and a unique identifier in a gaming system, the non-gaming machine terminal adapted to:

determine the unique identifier and the total value for the gaming voucher;

transmit, to a system controller of the gaming system, a request for payment of the total value;

receive, from the system controller, (i) authorization for payment of a cash value that is different from the total value and (ii) identification of a promotional value associated with the gaming voucher;

pay out the cash value; and generate a new gaming voucher having a new unique identifier and a new total value, wherein:

the new total value is equal to the promotional value associated with the gaming voucher; and upon receipt of the new gaming voucher, a gaming machine of the gaming system is aware of the total value associated with the gaming voucher, but the gaming machine is unable to segregate a promotional value associated with the new gaming voucher from the total value associated with the new gaming voucher, while the system controller is able to segregate the promotional value associated with the new gaming voucher from the total value associated with the new gaming voucher.

* * * * *